US007937735B2

(12) United States Patent
Avison

(10) Patent No.: US 7,937,735 B2
(45) Date of Patent: May 3, 2011

(54) APPARATUS FOR THE DECODING OF VIDEO DATA IN FIRST AND SECOND FORMATS

(75) Inventor: Ben Avison, Cambridge (GB)

(73) Assignee: Pace Plc, Saltaire, Shipley (GB)

( * ) Notice: Subject to any disclaimer, the term of this patent is extended or adjusted under 35 U.S.C. 154(b) by 1353 days.

(21) Appl. No.: 10/073,636

(22) Filed: Feb. 11, 2002

(65) Prior Publication Data

US 2002/0120942 A1    Aug. 29, 2002

(30) Foreign Application Priority Data

Feb. 27, 2001    (GB) .................................. 0104785.1

(51) Int. Cl.
*H04N 7/173*    (2006.01)
(52) U.S. Cl. .................. 725/90; 725/88; 725/89; 386/68
(58) Field of Classification Search ............ 725/87–104, 725/131–134, 139–142, 151–153; 386/6–8, 386/68, 81, 82, 96, 111, 125, 126
See application file for complete search history.

(56) References Cited

U.S. PATENT DOCUMENTS

| | | | | |
|---|---|---|---|---|
| 5,768,537 A * | 6/1998 | Butter et al. | ................... | 709/247 |
| 5,799,128 A * | 8/1998 | Van Den Enden | .............. | 386/68 |
| 5,842,046 A * | 11/1998 | Kajitani | ........................... | 710/74 |
| 5,844,478 A | 12/1998 | Blatter et al. | | |
| 5,867,176 A * | 2/1999 | Yamagishi | .................... | 345/473 |
| 5,899,582 A * | 5/1999 | DuLac | .......................... | 386/125 |
| 5,913,031 A | 6/1999 | Blanchard | | |
| 5,973,685 A * | 10/1999 | Schaffa et al. | ................. | 715/722 |
| 6,023,553 A * | 2/2000 | Boyce et al. | ................... | 386/109 |
| 6,028,726 A * | 2/2000 | Yanagihara | ..................... | 360/48 |
| 6,097,422 A | 8/2000 | Aref et al. | | |
| 6,141,491 A * | 10/2000 | Yamagishi et al. | ........... | 386/329 |
| 6,175,871 B1 * | 1/2001 | Schuster et al. | .............. | 709/231 |

(Continued)

FOREIGN PATENT DOCUMENTS

EP    0713341 A2    5/1996

(Continued)

OTHER PUBLICATIONS

"Information Technology-Generic Coding of Moving Pictures and Associated Audio Information System" International Standard, New York, NY Apr. 15, 1996.

*Primary Examiner* — Annan Q Shang
(74) *Attorney, Agent, or Firm* — Head, Johnson & Kachigian, P.C.

(57) ABSTRACT

The invention relates to the generation of video displays on a display screen from video data which is received as an encoded MPEG stream of data and then decoded and processed to be displayed. In the invention the video display can be generated in a conventional format or at least one use selectable alternative format, known as trick mode stream, such as a fast forward or fast cue display. The method of the invention allows the amount of data to be placed into the buffer memory prior to decoding and display of the data in the alternate format, to be calculated without reference to the MPEG stream information which is unavailable in the trick mode stream of data. The method therefore minimizes delay in the commencement and end of the display of the trick mode stream display format when selected by the user.

10 Claims, 1 Drawing Sheet

U.S. PATENT DOCUMENTS

| | | | |
|---|---|---|---|
| 6,259,441 B1 * | 7/2001 | Ahmad et al. | 715/720 |
| 6,353,700 B1 * | 3/2002 | Zhou | 386/353 |
| 6,389,218 B2 * | 5/2002 | Gordon et al. | 386/314 |
| 6,445,738 B1 * | 9/2002 | Zdepski et al. | 375/240.01 |
| 6,480,667 B1 * | 11/2002 | O'Connor | 386/83 |
| 6,490,627 B1 * | 12/2002 | Kalra et al. | 709/231 |
| 6,532,593 B1 * | 3/2003 | Moroney | 725/142 |
| 6,658,056 B1 * | 12/2003 | Duruoz et al. | 375/240 |
| 6,762,797 B1 * | 7/2004 | Pelletier | 348/559 |
| 6,871,006 B1 * | 3/2005 | Oguz et al. | 386/346 |
| 6,879,770 B1 * | 4/2005 | Van Asten et al. | 386/346 |
| 7,023,924 B1 * | 4/2006 | Keller et al. | 375/240.26 |
| 2001/0047517 A1 * | 11/2001 | Christopoulos et al. | 725/87 |

FOREIGN PATENT DOCUMENTS

| | | |
|---|---|---|
| EP | 0713341 A3 | 3/1999 |
| JP | 10327417 | 12/1998 |

* cited by examiner

APPARATUS FOR THE DECODING OF VIDEO DATA IN FIRST AND SECOND FORMATS

CROSS-REFERENCE TO RELATED APPLICATION

This application claims priority to British Patent Application No. 0104785.1 filed 27 Feb. 2001.

BACKGROUND OF THE INVENTION

The invention which is the subject of this application is related to the provision of broadcast data, from which television programs and other services, such as home shopping, games, internet services and the like can be generated, and particularly to the provision of streams of data which are referred to as "trick mode" streams of data.

The provision of transmitted digital data which is broadcast by service providers for reception at a large number of subscriber premises is increasing and can provide to users a range of functions and services in addition to the core television and radio programming. The data is transmitted in a specific international format set out by the Motion Picture Experts Group (MPEG). The broadcast data is received by a Broadcast Data Receiver (BDR) at each premises and the BDR decodes the encoded data received and generates video and/or audio for display via a display screen and/or speakers as appropriate, most typically those of a television set. Although reference is herein made to the invention with respect to a BDR it should be appreciated that the same can be applicable to other apparatus which generate video data such as, for example, DVD players, hard disk memory devices and the like.

In addition to the generation of video and audio there are an increasing number of different forms of user selectable services which can be selected via the BDR. One known service is Video on Demand (VOD). In this service the BDR user can select to view a program or film at that instant, or at a designated time in the future, and so the user does not have to be bound by any particular television or radio program scheduling imposed by the broadcaster. Typically the user is provided with a menu or list of available programs or films and can select to view the same, typically having been required to make a payment to the broadcaster. Upon selection, access to the necessary received data and decoding of the same is commenced via the BDR and the selected video and audio is then available to the user for the selected program or film.

As part of the video-on-demand service, which is typically defined as a "single-user service" for the specific user, the user can be presented with the opportunity to request that the MPEG format stream of data for the selected program or film is presented on screen in a fast cue/fast review form in which the picture moves more quickly, similarly to the Play Fast Forward function on a Video Cassette Recorder. This is conventionally achieved via a method whereby the video data server in or connected to the BDR delivers the said MPEG stream of data containing no audio data, and containing some or all of the "I-frames" from the video data (an MPEG video stream will typically contain an I-frame every half second or so).

Digital data in an MPEG format is typically provided in a series of hierarchical levels, one of which defines the generation of frames of the video display. The frames are defined in different categories, typically "I-frames" which are fully coded and can be decoded without reference to data for any other frames; "P frames" which, to be generated for display, need to be decoded with reference to data for earlier I or P frames, and "B frames" which, to be generated, need to be decoded with reference to previous or later I and P frames.

The I frames of data also allow for service data acquisition and for error recovery purposes, and importantly, can be decoded entirely without reference to adjacent frames of data.

However, in practice, when the provision of the fast review or fast cue service occurs, a problem arises due to the fact that at the transition between the generation of the video display generated from the normal stream of data and that generated for the fast cue/fast review service, (hereafter referred to as the trick mode stream of data), it is necessary to flush the video decoder buffer memory in the BDR of all data from the normal stream of data in order to avoid decoding and/or frame reordering errors. Thus, and as also the case at the recommencing of playing the normal stream of data, the BDR processing means is required to go through a phase of flushing and then pre-filling the video buffer memory device with the appropriate video data before decoding of the new stream of data, such as the trick mode stream of data, can commence. The level of data required to be placed into the buffer memory in the BDR is required to be set which is problematic as now described.

The problem with this process and particularly when transferring to the trick mode stream of data is that, unlike with a normal stream of data, the BDR has no access to the header fields "bit_rate" and "vbv_delay" data from the video stream which are normally used to determine the pre-fill data threshold of the buffer memory which is required to be reached to achieve the successful decoding of the data. The access is denied because the International Standard ISO/IEC 13818-1 (MPEG) defines "bit_rate" and "vbv_delay" data to be invalid in the case of the display of trick mode streams of data even though the actual data used for both formats of video display is effectively the same but dealt with in a different manner to generate the required video display format.

A conventional approach to overcome this problem is to generate a quantity of data into the buffer memory which is equal to that specified by the data field "vbv_buffer_size", which is a header field that is still valid for trick mode streams of data. However, in practice, this can lead to relatively large time delays of one or more seconds following the user selection of the trick mode stream and before the user can view on screen the trick mode stream display. This is especially so if the bitrate of the original data stream is somewhat below the defined maximum for the MPEG specified data profile/level.

The aim of the present invention is to provide a method which leads to the MPEG data decoder in the BDR, and hence the BDR service, being more responsive in the transition between the generation of displays between the normal streams of data and the trick mode stream of data.

SUMMARY OF THE INVENTION

In a first aspect of the invention there is provided a method for generating and processing data for the display of a stream of video data on a display screen connected to data processing apparatus, said apparatus processing an MPEG compliant data stream of video data selected to be viewed by a user in a first format via said apparatus and said user provided with means to select to view the said video data in an altered format, said altered format generated by the apparatus and characterized in that, following the user selection of the altered format, the method includes the step of identifying the required level of data to be held in a buffer memory in the apparatus prior to decoding the first frame of video data for the alternative format.

Typically the method includes the step of identifying a value for the separation of the encoded frames in the video data bitstream and using this value as a substitute for the various header field values of the MPEG data stream which are unavailable.

In one embodiment the identification of the value includes the step of referring to the timestamp information included in the bitstream of received data.

Typically the altered format is a fast cue or fast review display, hereinafter referred to as a trick mode stream of data.

In one embodiment, in a first step of the method, an estimation of the required buffer memory size for the largest frames of data, the I frame data, in the trick mode data stream is determined.

Typically, when the estimation is determined, a video buffer memory occupancy requirement is set at a value to avoid delay in the transition between the generation of video from the normal and trick mode video data streams. Typically the value set is at, or substantially at, a level so that it is of sufficient size to accommodate the data for the estimated size of the I frame.

Typically the MPEG format stream of data comprises a number of hierarchical levels, one of which is known as the systems layer and in which layer is included data referred to as time stamp data. This data acts as a reference to allow data in the other levels to be time synchronized and, at intervals, resynchronized by referring to and retrieving a common reference time from the time stamp data.

In a preferred embodiment the method includes the use of the time stamp data to estimate the size of the I frame data and hence the required video buffer memory size estimation. By using the time stamp data so the need to directly determine the amount of data in a single compressed frame can be avoided.

In a further aspect of the invention there is provided a method of generating a video display in a first standard MPEG format and a second user selectable fast forward or fast cue format, said method involving the steps of, upon user selection of the fast forward or fast cue format, obtaining a value indicative of the separation of received encoded frames in the video data bitstream and using that value as a replacement value to indicate a required level of data to be held in a buffer memory device prior to the commencement of the decoding and display of the first frame of data for the fast forward or fast cue display.

Thus, the invention relates to the use of a direct measurement of the separation of encoded frames in the video data bitstream to replace the use of various header fields which could be used in a normal MPEG data stream, but which are defined by MPEG to be invalid in the case of trick mode streams of video data and the use of timestamp information in the bitstream of data to complete the measurement.

DESCRIPTION OF THE DRAWING

Specific embodiments of the invention are now described with reference to the accompanying figures; wherein.

DESCRIPTION OF THE PREFERRED EMBODIMENTS

As discussed in the preamble one form of frame for video data in an MPEG stream is the I frame. The I-frames typically comprise the largest amounts of data compared to the other frame types. In a conventional MPEG video stream the data for the I frames is usually compressed into a size which is largely uniform for each I frame such that the data sizes for all the I frames are similar to within a few percent. This means that the video buffer memory occupancy requirement will not vary greatly from I frame to I frame.

A first step of the method of the present disclosure is that the compressed size of the first I frame encountered once the trick mode data stream is selected following a user selection, is used to set and estimate the buffer memory occupancy requirement to be satisfied before each and every subsequent picture frame decode is initiated to generate the video display. However, to directly determine the amount of data in a single compressed MPEG I frame can still be a fairly intensive operation, so the second part of the method of the application is to use the quantized nature of the timestamp data in the systems layer of the MPEG stream of data to efficiently estimate the size of the first frame, and therefore the required pre-fill threshold over time for the buffer memory.

For a normal MPEG stream of data, it is unnecessary to estimate how much data is required for the video buffer memory occupancy before the first picture is decoded, as the "vbv_delay" data from the picture header data in the MPEG format data stream provides the length of time that the data for the picture should spend in the buffer before it is decoded. By multiplying this by the "bit_rate" field from the sequence header data in the data stream the required threshold value is obtained.

However, for trick mode (fast cue/review) video data streams, neither the "vbv-delay" nor the "bit_rate" data can be used as, in accordance with International Standard Compliance requirements (see ISO/IEC 13818-1 section 2.4.3.7, under the description of "trick_mode_control") the use of the header data is prevented and, in order for the BDR to be MPEG compliant, which is typically commercially required, the BDR system cannot therefore use the same.

Figure 1:
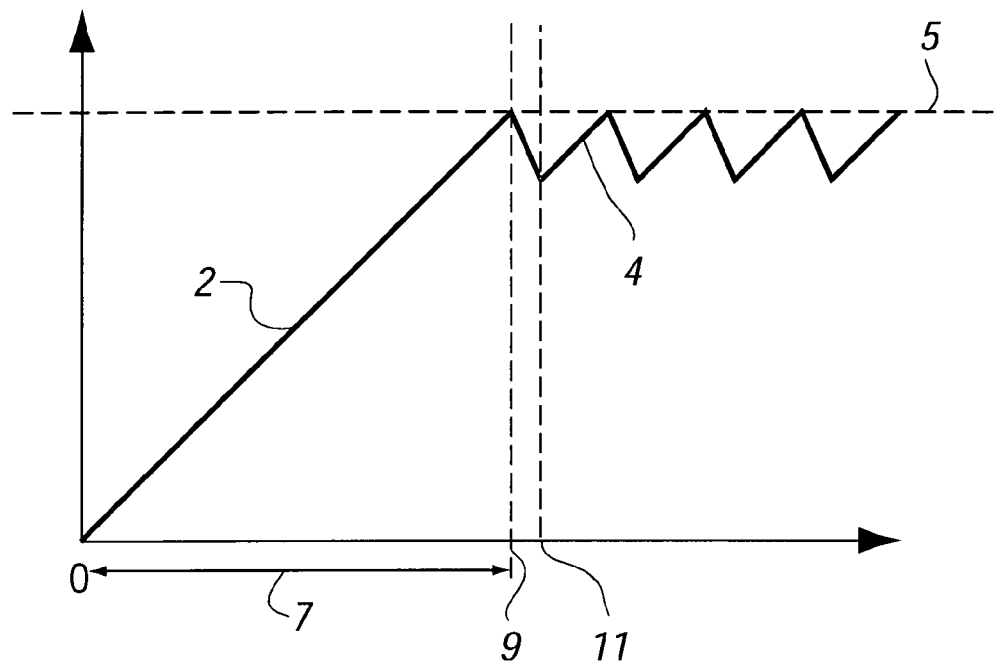
FIG. 1 illustrates the Video Buffer memory prefill threshold obtained in accordance with the conventional approach of using the vbv_buffer_size field data, for a trick mode stream of data.

As a result, conventionally, the only option for such streams of data has been deemed to be to wait for the buffer to reach the "vbv_buffer_size" header specified in the sequence header data. Although this is a safe option, in as much as it is guaranteed that taking this approach will never lead to the buffer memory under-running, and hence the video generated being stopped, it does have the drawback that it is difficult for video data encoders to accurately determine the appropriate value for "vbv_buffer_size" for a given stream. Because of this it is found that the encoder is typically set to have the "vbv_buffer_size" value at the maximum level allowed for the MPEG profile and level. This is often a gross exaggeration, especially for lower bitrate data streams, and it can lead to unacceptably long delays between the user selection of the trick mode streams being made and the display of the first decoded video picture display. This problem is illustrated in FIG. 1 where it is shown that, with the vbv_buffer_size value 5 at maximum as indicated by the broken line, then the amount of data required to reach that level in the buffer memory means that the initial addition of data to reach the level against time as illustrated by plot 2 takes a considerable time 7 following the user selection of the trick mode stream at time 0 and so reaching the required vbv_buffer_size is relatively long. Once the vbv_buffer_size value is reached the first frame can be decoded 9 and then displayed 11 as indicated, whereupon further data is required, as shown by line 4, to be added to the buffer memory until the vbv_buffer_size value 5 is reached again. However this time is, as is clearly shown, less than that previously required at the initial start for the first frame as illustrated by line 2. Furthermore, as at any one time there can be data for several frames in the buffer due to its size, it can also lead to the failure to decode a noticeable number of frames at the end of the trick mode stream when the buffer is flushed in preparation for return to normal MPEG stream display mode.

Figure 2:
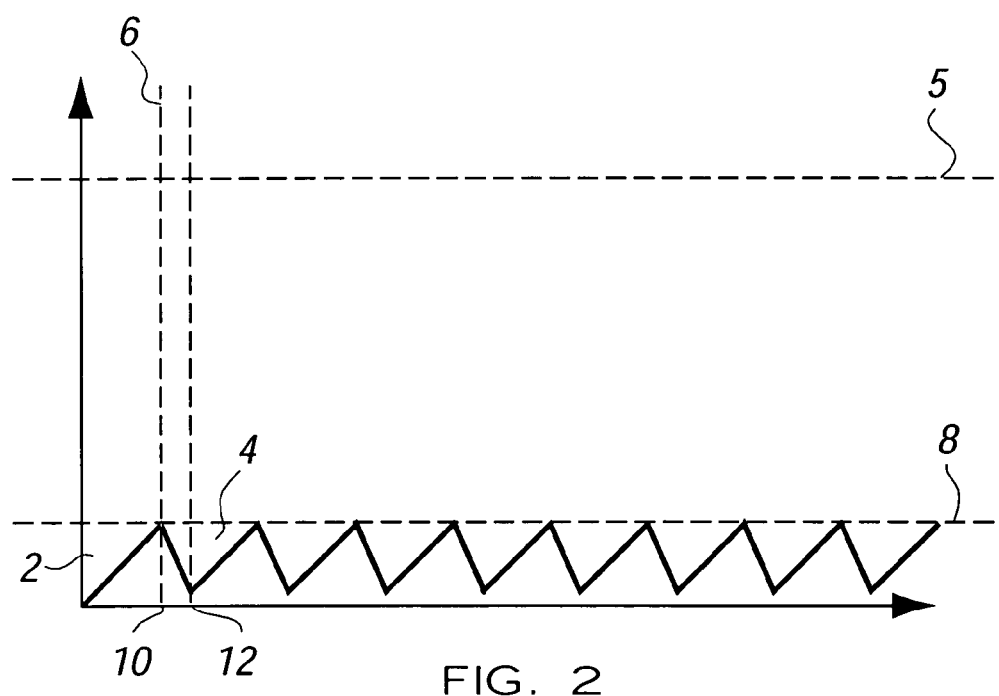
FIG. 2 illustrates a Video Buffer memory prefill value method in accordance with the invention for a trick mode stream of data.

The invention of this application sets out a solution to this problem based upon analysis of the data for the I-frames which I frames are typically of consistent size, usually within a few percent of each other in terms of amount of data. This, in conjunction with the fact that for trick mode data streams it is permissible for a decoded frame to be displayed repeatedly until the next frame is ready to be decoded, provides the design of a buffer memory data processing method as illustrated in FIG. 2.

In FIG. 2 there is again a graphical representation of, buffer memory data occupancy on the y axis against time on the x axis. The vbv_buffer_size value 5 is indicated but it is immediately apparent that this level of data is not required to be present in the buffer memory before the first frame decoding 10 and display 12 occurs. Instead, the method waits for the frame start code of the "next" frame to enter the buffer memory and waits for the same to be performed before decoding the data for the "current" frame or picture.

However, parsing the video stream in this way can be a relatively intensive task, so there are two steps taken to improve the method in accordance with the invention. Firstly, as the I-frames in the frames of data received are relatively uniform in size, the wait operation for the frame start is only performed once, as indicated by line 6 in FIG. 2 as, at the beginning of the trick mode data stream selection, the first I frame of data received is measured in terms of data size and a tolerance percentage value (which is typically relatively small) is added on to the measured data size to allow for variation from frame to frame. This value is then used as an estimation of the quantity of data required to be present in the buffer memory before the decoding of the first frame occurs. In FIG. 2 the quantity is represented by the line 8.

Secondly, at the start of the reception of the frames of data in the trick mode stream, reference is made to the systems layer data received by monitoring the PTS's (presentation time stamps) in the packet headers. Because the PTS's are quantized in steps of one frame, then as soon as the PTS is seen to change, it is deduced that the next payload of the data packet refers to the next frame received.

In practice, the data encoders prior to data transmission to the BDR tend to encode a PTS for each frame, but just in case one is encountered that doesn't, the BDR can be designed to use the vbv_buffer_size header value 5 as a fallback threshold, for the buffering time requirement.

One specific example for a typical trick mode stream display is as follows:

Prior to user selection of the tick mode stream, the MPEG stream of data received by the BDR has the following characteristics:

Main profile at main level, so vbv_buffer_size is 1835008 bits.

Original bitrate 3 Mbits/s so the Frame rate is 30 frames/s.
Every 15$^{th}$ frame is coded as an I-frame.
Mean I-frame size is 276720 bits (standard deviation 4%).

If the user then selects to view a trick stream mode of data display such as a "×2 cue" trick mode stream then the following two procedures could be performed, the first illustrating the conventional approach and the second illustrating the solution in accordance with the invention:

Firstly by referring only to the I-frames from this stream of data, then the actual bitrate for the trick mode is 4*276720=1106880 bits/s.

If the conventional approach of determining the prefill value of the buffer memory with reference to the vbv_buffer_size was used then the time to reach the required prefill threshold value 5 would be: 1835008/1106880=1.66 seconds.

However, in accordance with the invention a different prefill threshold value 8 is determined whereby the time required to reach the prefill threshold 8 using the method of the invention would be:

Mean I frame size divided by bitrate for the trick mode stream and so in this case 276720/1106880=0.25 seconds.

Thus the method of the present invention allows a faster response to the user selection of an alternative format of video display and also, when the BDR returns from a trick mode stream display to a normal display, a "cleaner" transition can be accomplished and hence improves the appearance of the display and the provision of the service to the user.

While the invention has been described with a certain degree of particularly, it is manifest that many changes may be made in the details of construction and the arrangement of components without departing from the spirit and scope of this disclosure. It is understood that the invention is not limited to the embodiments set forth herein for purposes of exemplification, but is to be limited only by the scope of the attached claim or claims, including the full range of equivalency to which each element thereof is entitled.

The invention claimed is:

1. A method for generating and processing data for the display of a stream of video data on a display screen connected to a data processing apparatus, said method comprising the steps of:

processing a motion picture expert group compliant data stream of video data selected to be viewed by a user in a first format via said apparatus, the largest frames of said video data known as I frames;

pre-filling a buffer memory in the apparatus with a first threshold level of said video data prior to decoding said video data, the user viewing the same in the first format;

said user selecting with selection means to view said video data in an altered format, and in response;

changing the required level of said video data to be held in said buffer memory for the altered format to a second threshold level;

wherein at the second threshold level the buffer memory substantially accommodates no more video data than that corresponding to a single I frame, plus a small tolerance percentage value;

filling the buffer memory with said video data corresponding to a single I-frame plus a same tolerance percentage value; and thereby generating an altered format for said video data, wherein the altered format is a fast cue or fast review video display.

2. A method according to claim 1 wherein the second threshold level is used in identifying a value of the separation of the encoded frames in the video data bitstream and this value is used as a substitute for various header field values of the motion picture expert group data stream which may be unavailable.

3. A method according to claim 1 wherein the second threshold level is set at a value to minimize delay in the transition between the generation of video from the normal and altered video formats.

4. A method according to claim 1 wherein the second threshold level of the buffer memory data is estimated by reference to time stamp data transmitted as part of the video data.

5. A method according to claim 4 wherein said time stamp data is carried as part of the systems layer and allows data in the other levels to be time synchronized by referring to and retrieving a common reference time from said time stamp data.

6. A method according to claim 4 including the use of said time stamp data to estimate the size of the I frame data and hence the second threshold level.

7. A method according to claim 1 wherein said video data having been transmitted from a location remote to the apparatus is received by the apparatus.

8. A method according to claim 7 wherein said apparatus is a broadcast data receiver connected to receive data from a broadcaster.

9. A method of generating a video display in a first standard motion picture expert group format and a second user selectable fast forward or fast cue format, said method comprising the steps of:

upon user selection of a fast forward or fast cue format during generation of the display in the first format, obtaining a value indicative of the separation of received encoded frames in a video data bitstream;

using said value as a replacement value to indicate a new threshold level of data to be held in a buffer memory device prior to the commencement of the decoding;

filling the buffer memory device with video data corresponding to a single I-frame;

displaying the frames of data for the fast forward or fast cue display; and wherein said new threshold level of data is substantially no more than that corresponding to the single largest frame in said video data bitstream plus a small tolerance percentage value.

10. A method of generating a video display as set forth in claim 9 including the additional step of referring to time stamp data transmitted as part of said video data to estimate said new threshold level of data.

* * * * *